United States Patent
Goldstein et al.

(10) Patent No.: US 10,592,077 B1
(45) Date of Patent: Mar. 17, 2020

(54) AI-POWERED TAGGING AND UI/UX OPTIMIZATION ENGINE

(71) Applicant: Capital One Services, LLC, McLean, VA (US)

(72) Inventors: Joseph Goldstein, Brooklyn, NY (US); Kevin Park, Little Neck, NY (US); Wenjie Liu, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/514,289

(22) Filed: Jul. 17, 2019

(51) Int. Cl.
*G06F 3/0484* (2013.01)
*G06F 3/0481* (2013.01)
*G06F 8/38* (2018.01)
*G06F 11/34* (2006.01)
*G06F 3/0488* (2013.01)

(52) U.S. Cl.
CPC .......... *G06F 3/0484* (2013.01); *G06F 3/0481* (2013.01); *G06F 3/04883* (2013.01); *G06F 8/38* (2013.01); *G06F 11/34* (2013.01); *G06F 11/3438* (2013.01)

(58) Field of Classification Search
CPC ........ G06F 8/38; G06F 11/3664; G06F 11/36; G06F 11/3604; G06F 11/3616; G06F 11/3668; G06F 11/3672; G06F 11/3676; G06F 11/368; G06F 11/3684; G06F 11/3688; G06F 11/3692; G06F 11/3696; G06F 11/3438; G06F 11/34; G06F 3/0484; G06F 3/0481; G06F 3/04883; G06N 5/04
See application file for complete search history.

(56) References Cited

U.S. PATENT DOCUMENTS

| | | | |
|---|---|---|---|
| 2004/0210661 | A1 | 10/2004 | Thompson |
| 2009/0006179 | A1 | 1/2009 | Billingsley et al. |
| 2009/0228492 | A1 | 9/2009 | Valdez et al. |
| 2012/0029661 | A1 | 2/2012 | Jones et al. |
| 2012/0198547 | A1* | 8/2012 | Fredette .................... G06F 8/34 726/19 |
| 2013/0151983 | A1* | 6/2013 | Lovitt ................... G06F 3/0481 715/745 |
| 2015/0081701 | A1 | 3/2015 | Lerios et al. |
| 2015/0106799 | A1* | 4/2015 | McDonough ......... G06F 3/0484 717/172 |
| 2015/0149966 | A1* | 5/2015 | Abraham .................. G06F 8/38 715/853 |
| 2017/0147190 | A1* | 5/2017 | Twist ........................ G06F 8/34 |

OTHER PUBLICATIONS

Morgan, H., "How AI solves UX/UI design problems?", UX Collective [online] 2018 [retrieved on Jul. 17, 2019]. Retrieved from Internet URL:https://uxdesign.cc/how-ai-solves-ux-ui-design-problems-9769a8757424, 7 pages.

* cited by examiner

Primary Examiner — Daniel Samwell (57) ABSTRACT

An artificial intelligence-based system and method for automatically generating and adjusting tags associated with one or more UI/UX related components or features is provided. Analysis may be performed on the data collected by the one or more tags so that design change recommendations can be dynamically recommended and/or implemented. When design changes are implemented, the system may automatically reconfigure or adjust all relevant tags. The AI-based system may be a standalone platform or may be incorporated into existing UI/UX programs.

17 Claims, 8 Drawing Sheets

AI-POWERED TAGGING AND UI/UX OPTIMIZATION ENGINE

BACKGROUND

In data analytics, a "tag" may be a small piece of code that is insertable or embeddable in a code base of a program. The tag may be configured to collect various types of information from the tagged source. Tags applied to a website, for example, may generate performance data associated with that website, such as the number of visitors in a timeframe, popular web pages, number of transactions, revenue-based trends, etc.

For software developers and other participants in user-interface/user-experience (UI/UX) design processes (e.g., product managers, designers, analysts), however, tagging may not be a seamless experience. Tagging numerous UI screens, for example, may be a tedious and time-consuming process, which may require a developer to manually tag all relevant components of each UI screen depending on the overall design of the UX. One typical problem arising out of this inherently manual process of tagging is that when the UI/UX design (e.g., sequence of the UI screens) is in any way altered, the developer must also manually modify the relevant tags to match the alteration. For example, if the third screen in a flow sequence is moved up to be the first screen, all tags previously associated with the third screen must now be modified to be associated with the first screen (in addition to the modifications of all effects to other screens in the existing service flow) so that data collected by those tags are correctly categorized and analyzed.

Moreover, the tagging process becomes highly complex when digital experiences have interconnected parts, complex features with distinct points of entry, or have multiple sets of users with different sets of rules. In addition, the process from UI/UX design to actually implementing the tags into the codebase may be disjointed, the extent of which is difficult to know until some level of testing is performed. Thus, there is a need for optimizing various aspects of the tagging and UI/UX design processes.

SUMMARY

An artificial intelligence-based system and method for automatically generating and adjusting tags associated with one or more UI/UX related components or features is provided. Analysis may be performed on the data collected by the one or more tags so that design change recommendations can be dynamically recommended and/or implemented. When design changes are implemented, the system may automatically reconfigure or adjust all relevant tags. The AI-based system may be a standalone platform or may be incorporated into existing UI/UX programs.

DETAILED DESCRIPTION

Various embodiments are generally directed to an artificial intelligence (AI)-based system and method for automatically generating and adjusting tags associated with one or more UI/UX-related components or features to dynamically optimize UI/UX design. In examples, an AI component (e.g., an AI-based system) may be incorporated in a stand-alone optimization platform, or in other examples, an AI component (e.g., an AI-based plugin) may be fit onto an existing UI/UX program to read and render one or more flows among a set of interface screens. It may be understood that the generation and adjustment of tags may extend beyond UI/UX programs and may be applicable to programs for building software and other types of programs for analysis (e.g., front-end and back-end program development, etc.).

According to embodiments, the AI component may receive a set (e.g., two or more) of UI screens (which may otherwise be referred to as screens or screen layouts) associated with an application, a file, a webpage, a program, etc. from a UI/UX developer, designer, etc. and one or more linking relationships between the set of screens. A linking relationship, for example, may generally define or indicate how the screens relate or correspond to each other. Based on these inputs, the AI component may determine all possible flows that an end-user may experience when interacting with the application, file, webpage, program, etc. based on the screens and their linking relationships, e.g., selecting one icon on a screen may take the flow in one direction while selecting a different icon on the same screen may take the flow in another direction. It may be understood that the term "flow" is to be expansively defined or interpreted and may include, for example, details regarding the endpoints of the flow, which may not be immediately apparent to the UI/UX developer, or various trails that lead to digital experiences outside of the current set of screens.

The AI component may chart, organize, or otherwise maintain all the possible flows corresponding to the set of screens. Based on the possible flows, the AI component may automatically generate tags for each flow and/or features thereof. For example, one or more tags may be generated for the flow itself to provide data related to the number of times an end-user experiences a specific flow. In another example, one or more tags may be generated for each screen in each flow, where the tags may indicate when the screen loads, the number of times the screen has been loaded, when the screen disappears, the number of disappearances, duration of time between a load and disappearance, etc. In yet another example, one or more tags may be generated for interface component(s) on each screen in each flow, such as an icon, a button, etc. As will be further described below, the tag may indicate how many times the icon was selected, how long the icon was pressed, the type of interaction such as a tap, swipe, hold, etc., whether a forward or backward button was pressed, whether a non-selectable interface component such as text, image, graphics, videos, etc. was tapped or attempted to be selected, and the like. Tags may be generated for other suitable aspects of the screens, the flows, and their relation to the overall UI/UX design.

In examples, templates may be automatically constructed to apply the generated tags into the codebase of the application, the file, webpage, program, etc. Thereafter, analysis may be performed on the data and information generated or provided by the tags. In some embodiments, the analysis may be performed by the AI component, or in other embodiments, the analysis may be performed by an external data analytics platform. The analysis may reveal specific usage patterns, trends, or information, which may be used to build test cases and optimize overall UI/UX design.

Based on at least UI/UX design goals, the analysis performed on the tag data, test results, and the like, the AI component may dynamically recommend design changes and/or new designs (or automatically implement those design changes and/or new designs), such as rearranging the sequence of screens in a specific flow, and further, automatically adjust or readjust the tags associated with the modifications accordingly. In further examples, design modifications may be manually input by the UI/UX developer, which may cause the AI component to automatically adjust or readjust the one or more tags corresponding to those modifications. It may be understood that, in addition to performing the tag adjustments within the code base, the AI component may be involved in all processes, for example, the AI component may take initial concept of the UI/UX design and automatically adjust and implement design changes thereafter. For example, the AI component may use existing tagging information to adjust one or more designs itself. In another example, the AI component may use the design adjustments that it makes and then adjust the tagging(s) within the codebase itself. Other variations related to the AI component may be understood to be implemented.

In previous solutions, the tagging process was at least tedious, manual, overly cumbersome, difficult to organize and maintain, and almost impossible to effectively apply in highly complex digital experiences, as described above. The embodiments and examples described herein overcome, improve upon, and are advantageous over the previous solutions in at least three ways. First, the generation and the application of tags are automatic and dynamic, which overcomes the tedious task of writing individual tag-related code. Second, the adjustment or readjustment of tags is automatic and dynamic when UI/UX design is modified, which overcomes the problem of the UI/UX developer having to manually recode all the tags to match the modification. Third, an AI component is layered on top of the technology and techniques herein, which may be configured to analyze various patterns and recommend modifications to the UI/UX design (and/or automatically and dynamically modifies the UI/UX design itself).

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

Figure 1:
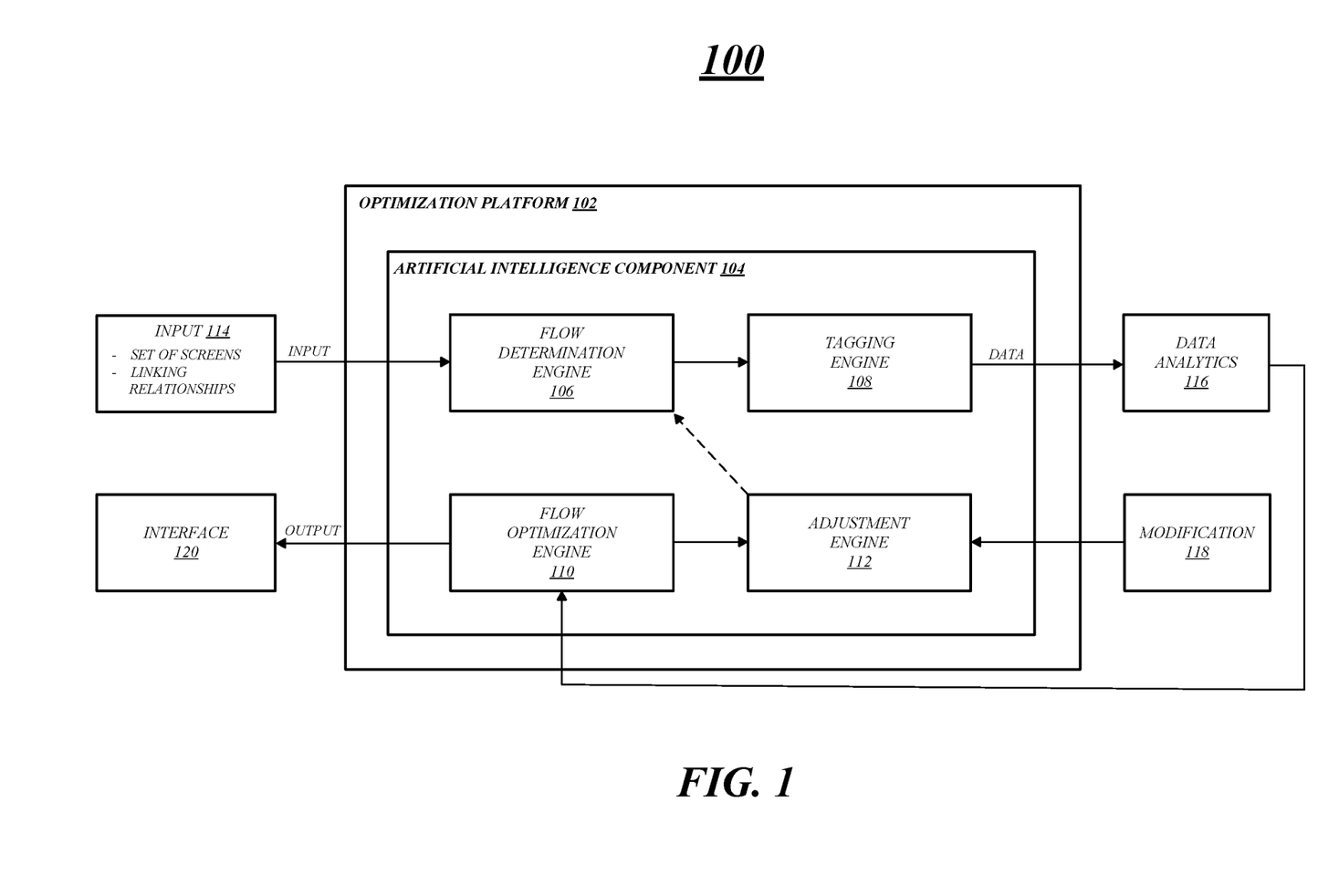
FIG. 1 illustrates an example optimization platform in accordance with one or more embodiments.

FIG. 1 illustrates an example optimization platform 102 according to embodiments. As shown, the optimization platform may be a distinct, standalone platform and includes at least an artificial intelligence (AI) component 104. The AI component 104 may include at least a flow determination engine 106, a tagging engine 108, a flow optimization engine 110, and an adjustment engine 112. It may be understood that one or more of the aforementioned engines may be arranged or configured outside of the AI component 104, but inside the optimization platform 102. Moreover, as described above, the AI component 104 and the engines therein may be part of a plugin configured to plug or fit into an existing UI/UX design program or editor.

The AI component 104 may receive input 114, which may be a set (e.g., two or more) of UI screens and one or more linking relationships of the UI screens in the received set. For example, a UI screen may be understood to be a graphical representation of the screen that an end-user would see and interact with and may include characteristics such as screen design, design framework, interface components, arrangement of components, color scheme, text, video, font, component and font sizes, icons, buttons, etc. As mentioned above, a linking relationship among the UI screens may generally define or indicate how the screens relate or correspond to each other in accordance with, for example, how the UX is designed. According to embodiments, the input 114 may be provided by a UI/UX developer, designer, programmer, manager, etc.

The input 114 may be received and analyzed by the flow determination engine 106. As will be further described below, the flow determination engine 106 may determine all possible "flows" that an end-user may experience within an application, file, website, program, etc. based on the set of screens and the linking relationships thereof. A flow may otherwise be known or referred to as a "journey," a "pathway," or a "sequence." For instance, the end-user selecting icons in a specific order may cause the screens to flow in a distinct manner. Moreover, a flow may include details regarding various endpoints of the flow, which may not be immediately apparent to the UI/UX developer, or various trails that lead to digital experiences outside of the current set of screens. In at least that regard, the flow determination engine 106 is configured to determine and capture all the possible use scenarios related to the set of screens. Each determined flow may be charted, maintained, and organized by the flow determination engine 106.

In one embodiment, the results of the flow determination process may be input to the tagging engine 108, which may be configured to generate one or more tags for each flow and/or features related thereto. For example, at least one tag may be generated for a particular flow, which may provide data related to the frequency in which users experience that particular flow, the duration of time the users are in the flow, etc. In another example, at least one tag may be generated for one or more screens associated with a particular flow to provided data on, for instance, the number of times the screens are loaded, the number of times a "back" icon is selected when the end-user is on those screens, the duration of time the end-user spends on the screens, etc. In yet a further example, at least one tag may be generated for one or more interface components of a screen, such as various icons, text, buttons, videos, images, etc., to provide data related to how the end-user interacts with the interface components, e.g., how many times an icon is selected, swiped, tapped, held, how many times a video has been played, whether non-selectable text has been touched or attempted to be selected, and the like. Tags may be generated by the tagging engine 108 for other suitable aspects, features, and/or components of the determined flow or the application, file, webpage, program, etc., as a whole.

Data provided by the tags generated by the tagging engine 108 may be input to a data analytics platform 116 for performing analytics on the data. As shown, the data analytics platform 116 may be a separate component external to the optimization platform 102. In some examples, it may be understood that the data analytics platform 116 may be included in either the optimization platform 102 or the AI component 104. The analytics performed by the data analytics platform 116 may reveal certain patterns, trends, characteristics, and the like related to how end-users use, experience, and interface with the set of screens. By way of example, the analytics may reveal that end-users tend to (or prefer to) experience a specific flow more often than the other flows. In a further example, the analytics may reveal that end-users spend less than a threshold time on a specific screen. In yet another example, the analytics may reveal that the "back" icon on a specific screen is selected more than a threshold number.

Results of the analytics from the data analytics platform 116 may then be fed into the flow optimization engine 110 for the dynamic optimization of the flow or features associated with the set of screens (and hence a portion of the overall UI/UX design). For example, the flow optimization platform 110 may determine that deleting the screen that end-users spend less time on will optimize design. Moreover, the flow optimization platform 110 may determine that the selection of the "back" icon more than a threshold number of times means that the end-users may have overlooked or missed an important piece of communication in the previous screen and further determine a new screen that again contains some or all of that information from preceding screen should be added as the succeeding screen.

In embodiments, the optimization determinations made by the flow optimization engine 110 may then be provided to an interface 120 as recommendations, for example, to a UI/UX developer, who may then take and implement the recommendations in the UI/UX design as they related to the set of screens provided as input 114. In other embodiments, the flow optimization platform engine 110 may provide the optimization determinations to the adjustment engine 112, which automatically implements the changes, as adjustments, in the UI/UX design. Thus, in the above-described example related to the addition of a new screen for example, the adjustment engine 112 may automatically create and add the new screen in the relevant flow. In some examples, the adjustment engine 112 may provide the modified set of screens to the flow determination engine 106 to further refine the optimization process. Moreover, the adjustment engine 112 may be configured to receive external modifications to the UI/UX design, for example, from the UI/UX developer (via the interface 120 in some instances), which can be processed and implemented by the adjustment engine.

Advantageously, the various components and engines of the optimization platform 102 shown in FIG. 1 and described above not only automates the tagging process, but also dynamically optimizes UI/UX design as it related to the sets of screens (and linking relationships) input into the platform. It may be understood that the systems, components, features shown in the optimization platform 102 may be supported and executed by hardware, such as processing circuitry, as will be further described below. Moreover, it may be understood that the optimization platform 102 and all related functionalities may be provisioned in a cloud.

Figure 2:
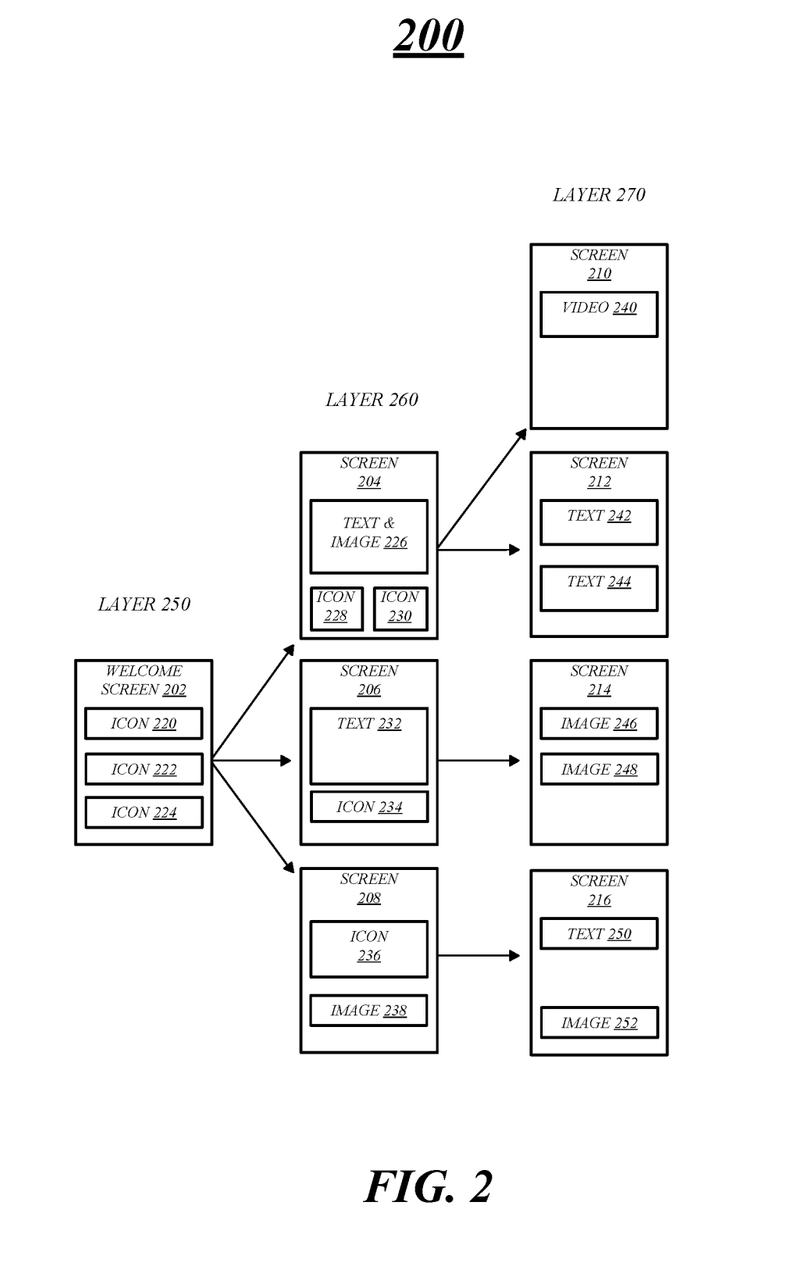
FIG. 2 illustrates an example set of user interface screens and their linking relationships in accordance with one or more embodiments.

FIG. 2 illustrates an example set of user interface screens and their linking relationships 200 related to a digital experience for one end-user according to embodiments. The digital experience for one end-user may refer to a UX associated with one end-user that is unaffected by other end-users.

As shown, the set of UI screens, or screen layouts, may include welcome screen 202 and screens 204, 206, 208, 210, 212, 214, and 216. The screens, for example, may include selectable interface components (e.g., icons, etc.) and/or non-selectable interface components (e.g., text, video, image, etc.). The one or more linking relationships of the screens may be depicted by the various arrows. For example, the first screen that the end-user sees when starting the digital experience may be the welcome screen 202, which displays icons 220, 222, 224. The selection of icon 220, for instance, may display screen 204, which contains a text and image component 206 and icons 228 and 230. The selection of icon 222 may display screen 206, which includes text 232 and icon 234. Similarly, the selection of icon 224 may display screen 208, which includes icon 236 and image 238. In this way, screens 204, 206, and 208 share linking relationships with screen 202.

As further shown, the end-user may select icon 228 on screen 204, which may result in screen 210, or may select icon 230, which may result in screen 212. Moreover, the end-user may select icon 234 on screen 206, which causes screen 214 to be displayed. And icon 236 may be selected on screen 208, which pulls up screen 216. Thus, screens 210 and 212 share linking relationships with screen 204, screen 214 shares a linking relationship with screen 206, and screen 216 shares a linking relationship with screen 208. The multiple layers of the linking relationships are depicted by layers 250, 260, and 270.

Figure 3:
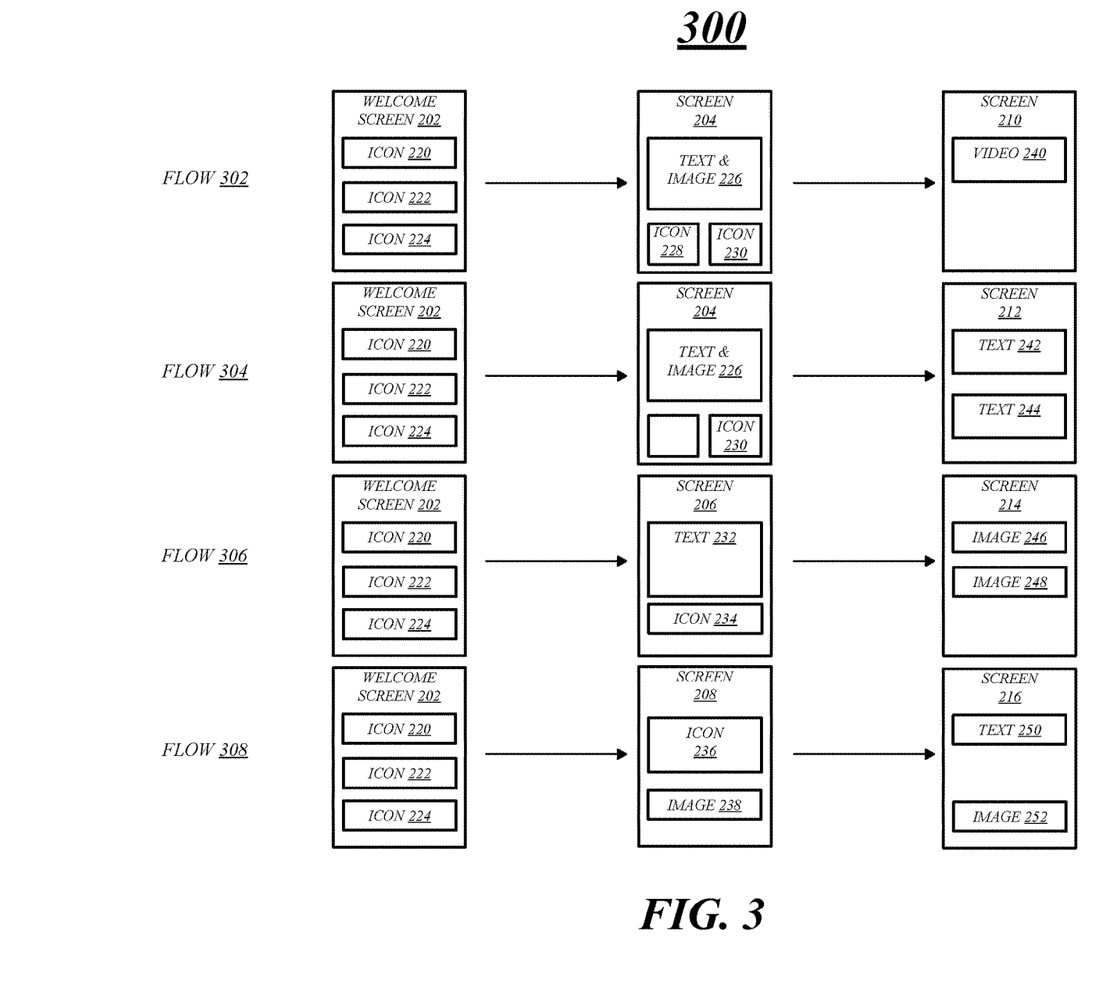
FIG. 3 illustrate example flows in accordance with one or more embodiments.

FIG. 3 illustrates example flows 300 corresponding to a set of UI screens according to embodiments. For ease of explanation, the UI screens and the linking relationships shown in FIG. 2 will be used to describe the flows illustrated in FIG. 3. As described above, a flow may refer to a particular path, journey, or sequence of UI screens that the end-user sees or experiences during the UX.

As shown, the set of UI screens 202, 204, 206, 208, 210, 212, 214, and 216 create at least four different flows, e.g., flows 302, 304, 306, 308. Each flow may represent a different possible path along the seven illustrated arrows in FIG. 2 between the layers 250, 260, and 270. For example, flow 302 represents a user-interactive path from screen 202 to screen 204 to screen 210 when the end-user selects icons 220 and 228 on screens 202 and 204, respectively. Flow 304 represents the path from screen 202 to screen 204 to screen 212 when the end-user selects icons 220 and 230 on screens 202 and 204, respectively. Thus, flows 302 and 304 may be related in that they start the same way until branching off into two directions, e.g., screens 210 and 212, from screen 204 based on the selection of either icon 228 or icon 230. Thus, the flows may be determined based on the one or more linking relationships, e.g., linking relationships 200, provided beforehand.

In a further example, flow 306 represents the path from screen 202 to screen 206 to screen 214 when the end-user selects icons 222 and 234, respectively. Similarly, flow 308 represents the path from screen 202 to screen 208 to screen 216. For flows 306 and 308, the respective flows do not diverge into separate branches since the end-user can only interact with one icon.

It may be understood that the set of UI screens 202, 204, 206, 208, 210, 212, 214, and 216 may create other suitable paths that may not be readily foreseeable or knowable by a UI/UX developer. By way of example, if the text and image component 226 was selectable by the end-user, a flow may start the same as flow 302, but the end-user at screen 204 may press a hyperlink in the text and image component 226, which may lead the end-user outside of the UI/UX environment, e.g., Internet, but within the confines of the UI/UX design. The ability to determine all possible flows, such as the ones that cannot be readily knowable or foreseeable, may be important to collecting the requisite tag data to dynamically optimize the UI/UX design.

The flows 302, 304, 306, and 308 along with other possible flows may be charted, organized, and maintained, for example, by an optimization platform. As described above, tags may be generated with respect to various aspects of the flows. For example, at least one may be generated for each of the flows 302, 304, 306, 308. Tags may also be generated for each screen in a given flow, e.g., screens 202, 204, 210 for flow 302, and further generated for each interface component of a given screen in a flow, e.g., text and image component 226, icon 228, icon 230 in screen 204 of flow 302. The various tags may provide data and reveal patterns, trends, etc. on how an end-user or end-users interact with the overall UI/UX design associated with the set of screens.

Figure 4:
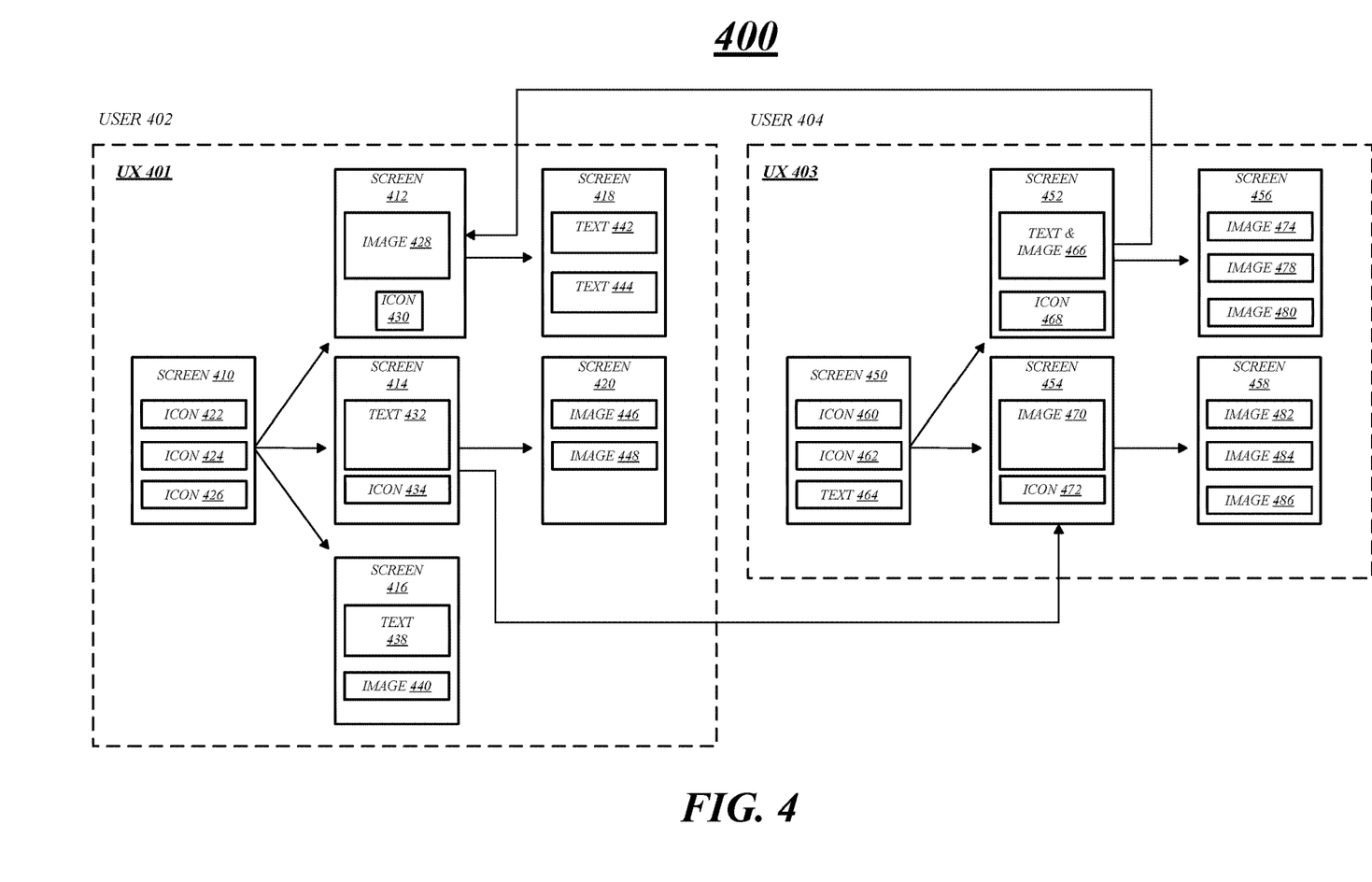
FIG. 4 illustrates another example set of user interface screens and their linking relationships in accordance with one or more embodiments.

FIG. 4 illustrates an example set of user interface screens and their linking relationships 400 related to digital experiences for at least two end-users according to embodiments. In examples, an action taken by a first end-user in a digital experience may affect a separate and distinct digital experience for a second end-user, which may affect how an action may be taken by the second end-user. The inverse scenario may also be true—the actions of the second end-user may affect the actions of the first end-user.

As illustrated, two separate UXs 401 and 403 may be set up for two separate end-users 402 and 404, respectively. UX 401 may include a set of at least six different UI screens, such as UI screens 410, 412, 414, 416, 418, and 420. UX 403 may include a set of at least five UI screens, e.g., screens 450, 452, 454, 456, and 458. Similar to the screens illustrated in FIG. 2, each of the screens in both UXs 401 and 403 may have one or more interface components, which may either be selectable or non-selectable by the end-users. Moreover, the arrows in each UX show the one or more linking relationships among the set of UI screens.

For example, in UX 401, the first screen that end-user 402 may see is screen 410, which displays icons 422, 424, and 426. When icon 422 on screen 410 is selected by the end-user 402, screen 412 may be displayed, which contains image 428 and icon 430. When icon 424 is selected, screen 414 may be displayed, which includes text 432 and icon 434. Moreover, when icon 426 is selected, screen 416 may be displayed, which contains text 438 and image 440. As shown, screens 412 and 414 have only one selectable interface component, e.g., icons 430 and 434, respectively. Thus, when the end-user 402 selects icon 430 on screen 412, screen 418 having text 442 and 444 may be displayed, and similarly, when icon 434 is selected, screen 420 having image 446 and 448 may be displayed. Since screen 416 does not have any selectable interface components, the flow may stop at screen 416.

As further shown in FIG. 4, when end-user 402 interacts with screen 414, such as selecting icon 434 or pressing a hyperlink in text 432 or the like, the interaction triggers an effect on screen 454 of UX 403, as illustrated by the arrow. For example, if icon 434 is selected, image 470 on screen 454 may be displayed different or an entirely different image may be displayed. In another example, if a hyperlink in the text 432 is selected, a different icon may be displayed for the end-user 404 to select.

In UX 403, the first screen that end-user 404 may see is screen 450 having icons 460, 462, and text 464. Selecting icon 462 may display screen 452, which has a text and image component 466 and icon 468, and selecting icon 462 may display screen 454, which contains image 470 and icon 472. Moreover, the selectin of icons 468 and 472 leads to the display of screens 456 and 458, respectively, each of which contains three different images, e.g., images 474, 478, 480, 482, 484, and 486. When the end-user 404 interacts with one or more interface components on screen 452, however, the interaction may cause an effect on screen 412 in UX 401. For instance, an image different from the image 428 may be displayed, the icon 430 may be a different icon, additional interface components may be added in screen 412, etc.

It may be understood that FIG. 4 is a simplified version of the various complex cause-and-effect scenarios that may occur when two or more UXs with multiple users are interacting with or among each other. Thus, many other suitable scenarios may be possible.

Figure 5:
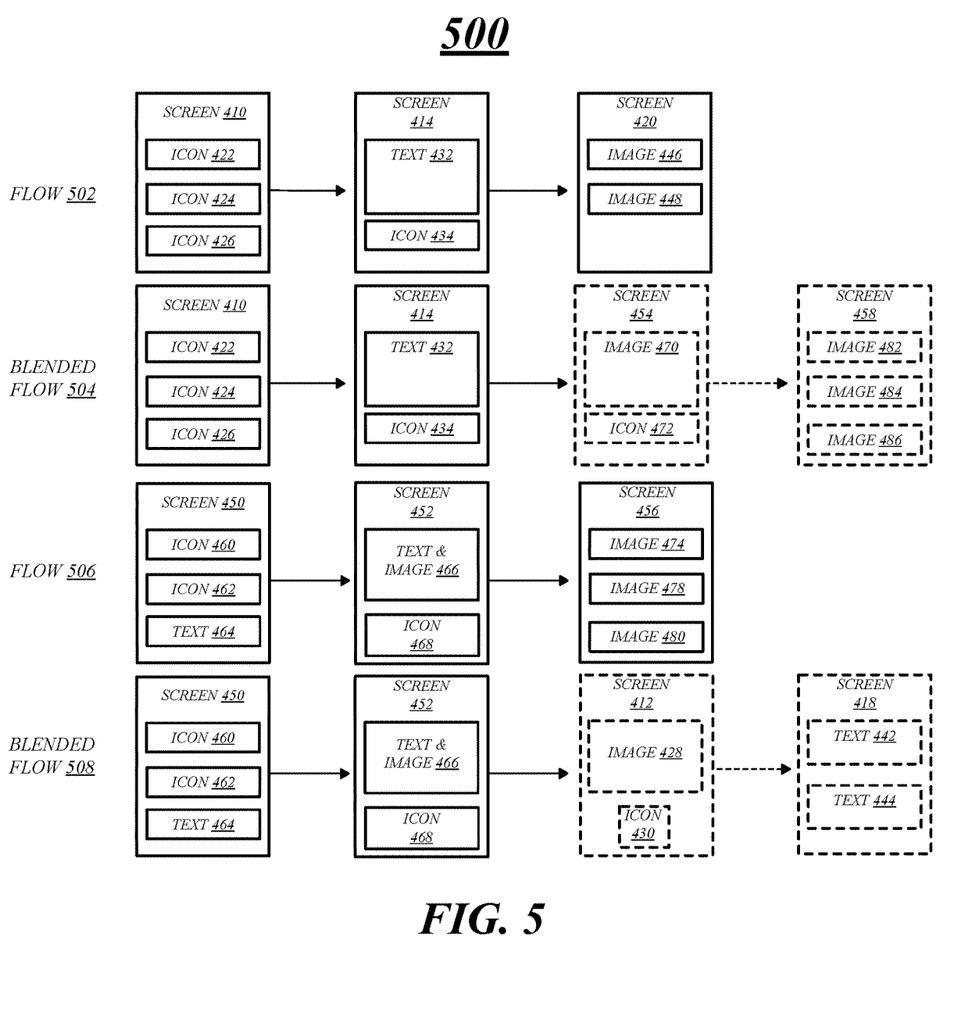
FIG. 5 illustrate example flows and blended flows in accordance with one or more embodiments.

FIG. 5 illustrates example flows and blended flows 500 corresponding to two separate sets of UI screens associated with two different end-users according to embodiments. For ease of explanation, the UI screens and the linking relationships shown in FIG. 4 will be used to describe the flows and blended flows illustrated in FIG. 5. A "blended" flow may be understood to refer to a flow, path, or journey having screens from two or more UXs based on the interactions from two or more end-users.

Flow 502, for example, is the path created by the interaction from screen 410 to screen 414 to screen 420. Accordingly, flow 502 is a flow within the confines of UX 401. The blended flow 504, however, is the path created by the interaction from screen 410 to screen 414, but it also includes the effect(s) of the interaction(s) by end-user 402 with screen 414, which blends into the interaction of end-user 404 with screens 454 and 458 in UX 403, as indicated by the dashed outlines of screens 454 and 458.

Flow 506 is a path created by the interactions solely in UX 403—the interaction is from screen 450 to screen 452 to screen 456. The blended flow 508, similar to blended blow 504, includes the effect(s) of the interaction(s) by the end-user 404 with screen 452, which blends into the interaction of end-user 402 with screens 412 and 418 in UX 401, as indicated by the dashed outlines of screens 412 and 418.

All the flows 502, 506 and all the blended flows 504 and 508 may be charted, organized, and maintained, for example, by an optimization platform. Similar to FIG. 3 and as described above, tags may be generated with respect to various aspects of the flows 502, 504, 506, 508, and other suitable flows. Tags may also be generated for each screen in a given flow and/or for each interface component of a given screen in a flow. The various tags may provide data and reveal patterns, trends, etc. on how an end-user or end-users interact with the overall UI/UX design associated with the set of screens. As may be understood, the complexity of the interactions between multiple UXs among multiple end-users increases significantly as the number of UXs and end-users increase. In at least that regard, the embodiments and examples described herein advantageously account for these complexities to automatically and dynamically perform optimization.

Figure 6:
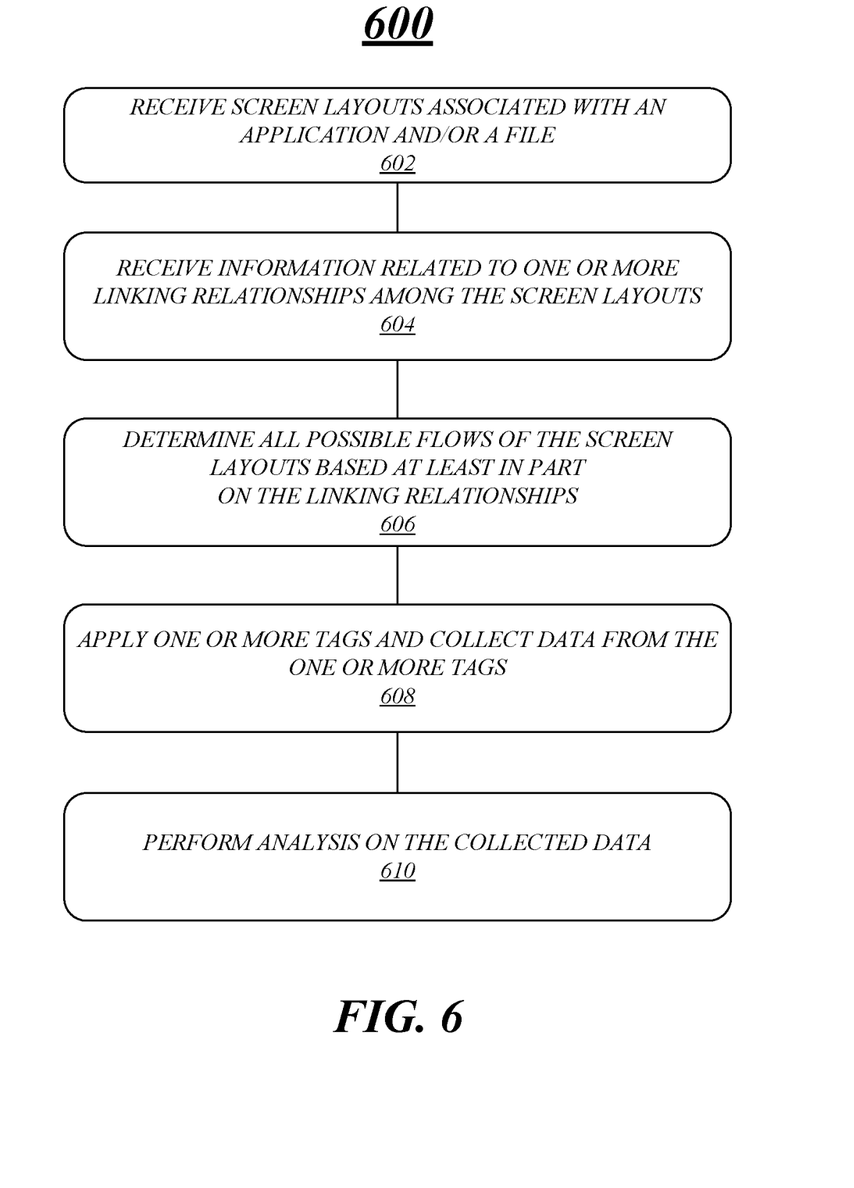
FIG. 6 illustrates an example flow diagram in accordance with one or more embodiments.

FIG. 6 illustrates an example flow diagram 600 according to one or more embodiments. The flow diagram 600 may be related to the automatic tagging and dynamic optimizing of a UI/UX design. It may be understood that the features associated with the illustrated blocks may be performed or executed by one or more computing devices and/or processing circuitry contained therein that can run, support, execute a UI/UX optimization platform, such as the one illustrated in FIG. 1.

At block 602, a plurality of UI screen layouts may be received, the screens which may be associated with an application, a file, a website, a webpage, etc. The screen layout, or screen, may be a graphical representation of the UI that an end-user may see and interact with, and further, the screen layouts may contain one or more interface components, such as icons, images, text, video, etc., which may be selectable or non-selectable by the end-user.

At block 604, information related to one or more linking relationships among the screen layouts may be received. As described above, a linking relationship, may define or indicate how the screens relate or correspond to each other. For example, a screen with a "check balance" icon will share a relationship with a screen actually showing the account balance.

At block 606, all the possible flows of the screen layouts may be determined based at least in part on the one or more linking relationships received at block 604. As set forth above, a flow may refer to a particular path, journey, or sequence of UI screens that the end-user sees or experiences during a user experience. For instance, an end-user selecting icons in a specific order may cause the screens to flow in a distinct manner. The "flow" may otherwise be known or referred to as a "journey," a "pathway," or a "sequence." Moreover, a flow may include details regarding various endpoints of the flow, which may not be immediately apparent to the UI/UX developer, or various trails that lead to digital experiences outside of the current set of screens.

At block 608, one or more tags may be generated and/or applied, and further, data from the one or more tags make by collected. For example, a tag may be generated for a particular flow, which may provide data related to the frequency in which users experience that particular flow, the duration of time the users are in the flow, etc. A tag may also be generated for one or more screens associated with a particular flow to provided data on, for instance, the number of times the screens are loaded, the number of times a "back" icon is selected when the end-user is on those screens, the duration of time the end-user spends on the screens, etc. Moreover, a tag may be generated for one or more interface components of a screen, such as various icons, text, buttons, videos, images, etc., to provide data related to how the end-user interacts with the interface components.

At block 610, analysis may be performed on the data collected by the one or more tags to dynamically optimize the UI/UX design. For example, if the collected data indicates that the end-user is "stuck" on a particular screen and selects the "back" icon one or more times, this may indicate an inefficiency in the flow or design of the UI/UX program. Based on the analysis, an AI component may dynamically recommend design changes and/or automatically implement the recommendations.

It may be understood that the blocks illustrated in FIG. 6 are not limited to any specific order. One or more of the blocks may be performed or executed simultaneously or near simultaneously.

Figure 7:
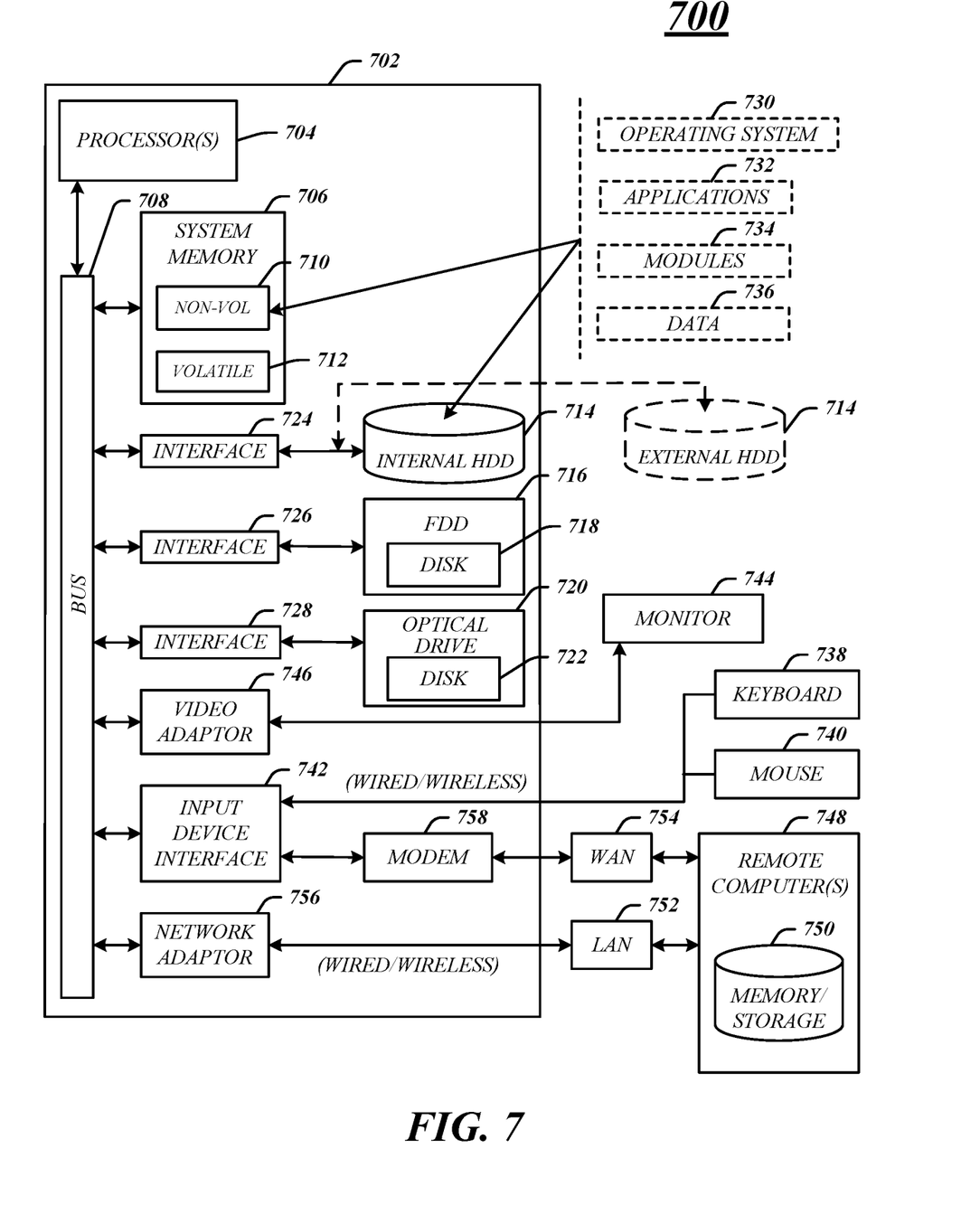
FIG. 7 illustrates an example computing architecture of a computing device in accordance with one or more embodiments.

FIG. 7 illustrates an embodiment of an exemplary computing architecture 700, e.g., of a computing device, such as a desktop computer, laptop, tablet computer, mobile computer, smartphone, etc., suitable for implementing various embodiments as previously described. In one embodiment, the computing architecture 700 may include or be implemented as part of a system, which will be further described below. In examples, one or more computing devices and the processing circuitries thereof may be configured to at least run, execute, support, or provide the UI/UX optimization platform, e.g., optimization platform 102, and related functionalities (via, for example, backed server computers) and/or the various applications, files, websites, etc. on the end-user side (via, for instance, mobile computers, smartphones, tablet computers, etc.).

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes processor 704, a system memory 706 and a system bus 708. The processor 704 can be any of various commercially available processors, processing circuitry, central processing unit (CPU), a dedicated processor, a field-programmable gate array (FPGA), etc.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 800.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
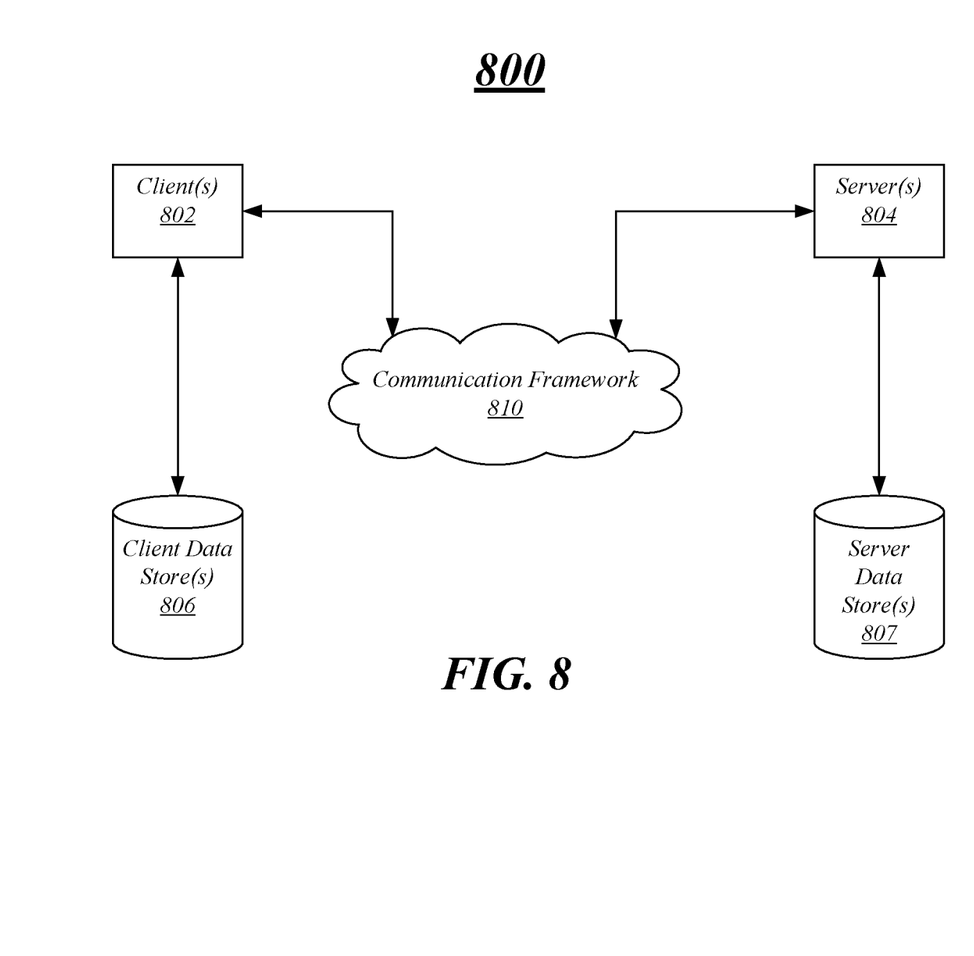
FIG. 8 illustrates an example communications architecture in accordance with one or more embodiments.

FIG. 8 is a block diagram depicting an exemplary communications architecture 800 suitable for implementing various embodiments. For example, one or more computing devices may communicate with each other via a communications framework, such as a network. At least a first computing device connected to the network may be one or more server computers, which may be implemented as a back-end server or a cloud-computing server, which may run the optimization platform described herein, e.g., optimization platform 102 and perform all related functionalities. At least a second computing device connected to the network may be a data analytics service, such as a third-party service, configured to provide the optimization platform analytics on the tag data, or may be a different back-end server (different from the first computing device) that can perform the analytics in-house. Alternatively, the second computing device may a computing device, such as a mobile device (e.g., laptop, smartphone, tablet computer, etc.) or any other suitable computing device that belongs to the UI/UX end-user.

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The one or more clients 802 and the servers 804 are operatively connected to one or more respective client data stores 806 and server data stores 807 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system comprising:
   one or more computing devices, wherein the one or more computing devices comprises:
   a memory to store instructions; and
   processing circuitry, coupled with the memory, operable to execute the instructions, that when executed, cause the processing circuitry to:
   receive a plurality of screen layouts associated with one or more applications or files, wherein each of the plurality of screen layouts includes at least one interface component;
   receive information related to one or more linking relationships among the plurality of screen layouts, wherein the one or more linking relationships includes a first set of linking relationships of screen layouts corresponding to a first user and a second set of linking relationships of screen layouts corresponding to a second user;
   determine all possible flows of the plurality of screen layouts associated with the first user and the second user based at least in part on information related to how the first and second sets of linking relationships interconnect, wherein each flow indicates a screen layout sequence experienced by at least the first and second users;
   apply one or more tags to one or more features associated with one or more of the following: (i) each screen layout of each flow and (ii) each of the at least one interface component of each screen layout of each flow;
   collect data from the one or more tags; and
   perform analysis on the collected data to optimize user experience for at least the first and second users based on the performed analysis.

2. The system of claim 1, wherein the one or more linking relationships indicates one or more of the following: (i) how two or more of the plurality of screen layouts link to or among each other and (ii) how the at least one interface component of the two or more of the plurality of screen layouts link to or among each other.

3. The system of claim 1, wherein the processing circuitry is further caused to:
   determine whether any screen layout in the sequence for each flow requires rearranging based at least in part on the analysis performed on the collected data;
   determine a new sequence of the plurality of screen layouts, wherein the new sequence optimizes the user experience;
   rearrange, automatically, the plurality of screen layouts in the flow based on the new sequence; and
   adjust, automatically, the one or more tags based on the rearrangement.

4. The system of claim 3, wherein the determination of the rearranging or the determination of the new sequence is based at least in part on one or more patterns of interaction by at least the first and second users with the plurality of screen layouts or the at least one interface component of each screen layout.

5. The system of claim 1, wherein the system is an artificial intelligence (AI)-based system.

6. The system of claim 5, wherein the AI-based system is a standalone platform or a plugin configured to fit into a user interface (UI)/user experience (UX) program.

7. The system of claim 1, wherein the application is at least a mobile device application or a web application.

8. The system of claim 6, wherein the one or more applications or files is built by the UI/UX program, and the UI/UX program is configured to read and render the one or more linking relationships and each flow.

9. The system of claim 1, wherein the first set of linking relationship and the second set of linking relationship originate from separate respective applications or files.

10. The system of claim 9, wherein the processing circuitry is further caused to receive information related to how the first set of linking relationships and the second set of linking relationships interconnect across the separate applications or files.

11. The system of claim 1, wherein the processing circuitry is further caused to:
generate, automatically, the one or more tags; and
determine whether the screen layout of each flow has changed; and
adjust, automatically, the screen layout sequence for the respective flow based on the determined change.

12. The system of claim 1, wherein the one or more tags are applied in a code base corresponding to the one or more applications or files.

13. The system of claim 1, wherein the one or more tags is configured to generate data at least on (i) when a screen layout loads, (ii) when the screen layout disappears, (iii) when the at least one interface component is selected, pressed, tapped, held, or swiped, (iv) a duration of time that the screen layout is displayed, and (v) a number of times the screen layout is loaded by the user in a session.

14. The system of claim 5, wherein the AI-based system is configured to dynamically and automatically determine where or how to reapply or readjust the one or more tags to improve the optimization of the user experience based on the analysis performed on the collected data.

15. The system of claim 5, wherein the AI-based system, based on the analysis performed on the collected data, is configured to:
recommend one or more new or modified flow designs;
implement, automatically, the one or more new or modified flow designs;
reapply or readjust the one or more tags based on the one or more new or modified flow designs; and
collect additional data on the one or more reapplied or readjusted tags for further analysis to optimize the user experience.

16. A method comprising:
receiving, via one or more computing devices, a plurality of screen layouts, wherein each of the plurality of screen layouts includes at least one interface component;
receiving, via the one or more computing devices, information related to one or more linking relationships among the plurality of screen layouts, wherein the one or more linking relationships includes a first set of linking relationships of screen layouts corresponding to a first user and a second set of linking relationships of screen layouts corresponding to a second user;
determining, via the one or more computing devices, all possible flows of the plurality of screen layouts associated with the first and second sets of linking relationships based at least in part on information related to how the first and second sets of linking relationships interconnect, wherein each flow indicates a screen layout sequence experienced by at least the first and second users; and
applying, via the one or more computing devices, one or more tags to one or more features associated with one or more of the following: (i) each screen layout of each flow and (ii) each of the at least one interface component of each screen layout of each flow.

17. A non-transitory computer-readable storage medium storing computer-readable program code executable by a processor to:
receive a plurality of screen layouts associated with one or more applications or files, wherein each of the plurality of screen layouts includes at least one interface component;
receive information related to one or more linking relationships among the plurality of screen layouts, wherein the one or more linking relationships includes a first set of linking relationships of screen layouts corresponding to a first user and a second set of linking relationships of screen layouts corresponding to a second user;
determine all possible flows of the plurality of screen layouts associated with the first user and the second user based at least in part on information related to how the first and second sets of linking relationships interconnect, wherein each flow indicates a screen layout sequence experienced by at least the first and second users;
apply one or more tags to one or more features associated with one or more of the following: (i) each screen layout of each flow and (ii) each of the at least one interface component of each screen layout of each flow;
collect data from the one or more tags; and
perform analysis on the collected data to optimize user experience for at least the first and second users based on the performed analysis.

* * * * *